(12) United States Patent
Hewitt et al.

(10) Patent No.: US 8,994,555 B2
(45) Date of Patent: Mar. 31, 2015

(54) VACUUM INSULATION PANEL QUALITY CONTROL SYSTEMS AND METHODS FOR USING SAME

(71) Applicant: Caralon Global Limited, Milton Keynes (GB)

(72) Inventors: Charles Hewitt, London (GB); Timothy Wojciechowski, Westlake, OH (US)

(73) Assignee: Caralon Global Limited (GB)

( * ) Notice: Subject to any disclaimer, the term of this patent is extended or adjusted under 35 U.S.C. 154(b) by 159 days.

(21) Appl. No.: 13/758,659

(22) Filed: Feb. 4, 2013

(65) Prior Publication Data
US 2013/0201032 A1 Aug. 8, 2013

Related U.S. Application Data

(60) Provisional application No. 61/594,819, filed on Feb. 3, 2012.

(51) Int. Cl.
*G08B 21/00* (2006.01)
*G08C 17/02* (2006.01)
*H04Q 9/00* (2006.01)

(52) U.S. Cl.
CPC ............ *G08C 17/02* (2013.01); *H04Q 9/00* (2013.01); *H04Q 2209/47* (2013.01)
USPC .................................... 340/870.16

(58) Field of Classification Search
USPC .................................... 340/870.16
See application file for complete search history.

(56) References Cited

U.S. PATENT DOCUMENTS

| 8,152,367 B2 * | 4/2012 | Roberts et al. ............ 374/141 |
| 2009/0243802 A1 | 10/2009 | Wolf et al. | |

FOREIGN PATENT DOCUMENTS

| DE | 1001 59 518 A1 | 6/2003 |
| WO | WO01/27602 A2 | 4/2001 |

OTHER PUBLICATIONS

Brunner et al., "In situ performance assessment of vacuum insulation panels in a flat roof construction," Vacuum 82 (2008), pp. 700-707.

* cited by examiner

*Primary Examiner* — Brian Zimmerman
*Assistant Examiner* — Sara Samson
(74) *Attorney, Agent, or Firm* — Pepper Hamilton LLP

(57) ABSTRACT

A system and method for implementing quality control for a panel is described. For example, the panel may be configured as a vacuum insulation panel having sensors arranged within the panel and/or on a surface thereof. A radio frequency identification unit may be in operable communication with the sensor and may transmit panel information to an external radio frequency identification receiver. A data collation element in operable communication with the radio frequency identification receiver may be configured to receive and analyze aggregated panel performance data received from the radio frequency identification receiver.

13 Claims, 3 Drawing Sheets

VACUUM INSULATION PANEL QUALITY CONTROL SYSTEMS AND METHODS FOR USING SAME

CROSS-REFERENCE TO RELATED APPLICATIONS

This application claims the benefit of U.S. Provisional Application No. 61/594,819, filed on Feb. 3, 2012, the contents of which are incorporated by reference in its entirety as if fully set forth herein.

BACKGROUND

Significant product reliability problems exist for vacuum insulation panels (VIPs). In addition, it is difficult to identify panels in VIP systems that have marginal failures. A marginal failure occurs when a VIP has not fully inflated or has a micro-leak resulting from, for example, handling or materials. Any of these failures can cause a reduction in performance due to a loss of vacuum.

In some cases, conventional VIP systems do not verify the panel performance and, as such, cannot detect leaks in the systems. Alternatively, conventional VIP quality control systems require direct contact with a VIP in order to identify a leak because the quality control systems detect leaks by performing thermal testing of the panel. In such a case, the amount of time and effort required to fully test a VIP system can be significant.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a quality control system may include a sensor having a dielectric film, an RFID unit in operable communication with the dielectric film that receives panel information, a RFID receiver configured to receive panel performance data, including the panel information, transmitted from the RFID unit, and a data collation system in operable communication with the RFID receiver and configured to analyze aggregated panel performance data received from the RFID receiver.

In an embodiment, a method of aggregating panel performance data may include detecting panel information using a sensor and/or a dielectric film, transmitting the panel information to an RFID unit, transmitting panel performance data, including the panel information, to an RFID receiver, aggregating panel performance data at a data collation system, and analyzing the aggregated panel performance data by the data collation system.

In an embodiment, a quality control system for a panel may comprise at least one sensor; a radio frequency identification unit in operable communication with the sensor, the radio frequency identification unit being configured to receive panel information associated with the panel; a radio frequency identification receiver configured to receive panel performance data transmitted from the radio frequency identification unit, the panel performance data comprising the panel information; and a data collation element in operable communication with the radio frequency identification receiver and configured to analyze aggregated panel performance data received from the radio frequency identification receiver.

In an embodiment, a method of aggregating panel performance data may comprise detecting panel information using a sensor; transmitting, by the sensor, the panel information to a radio frequency identification unit; transmitting, by the radio frequency identification unit, panel performance data to an radio frequency identification receiver, the panel performance data comprising the panel information; aggregating panel performance data at a data collation system; and analyzing the aggregated panel performance data by the data collation system.

DETAILED DESCRIPTION

Figure 1:
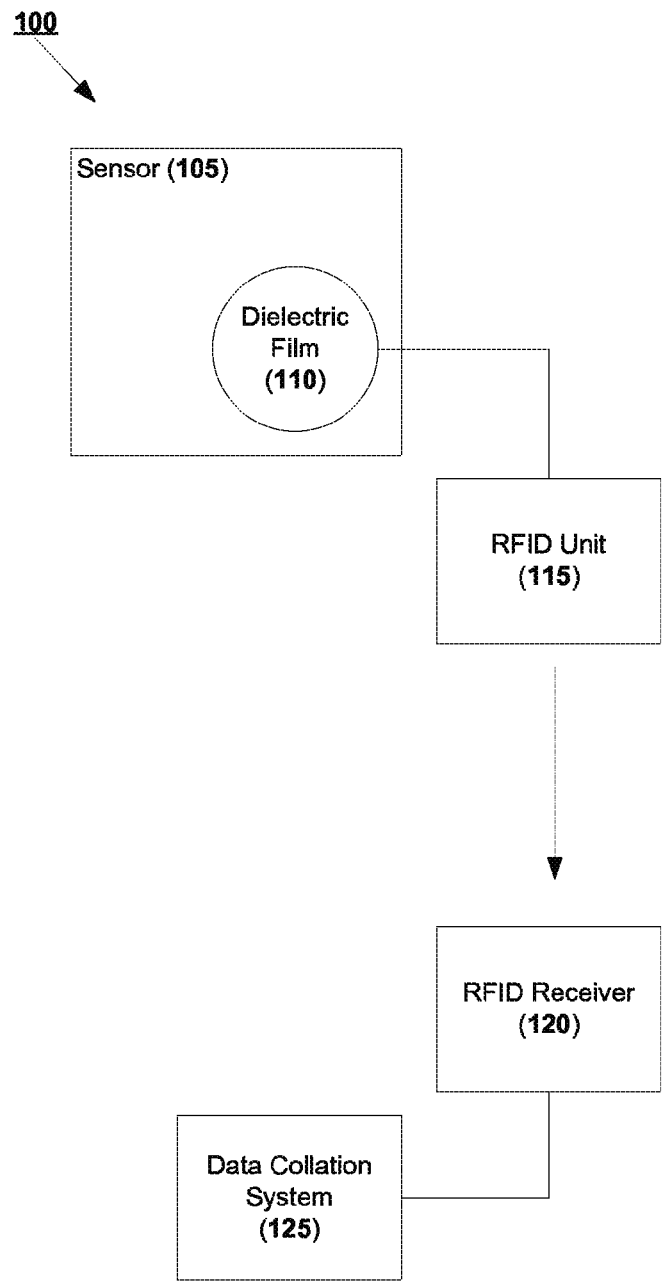
FIG. 1 depicts an illustrative block diagram of a VIP quality control system according to an embodiment.

The following terms shall have, for the purposes of this application, the respective meanings set forth below:

The present disclosure pertains to vacuum insulation panel (VIP) quality control systems and methods for using such systems. The use of such quality control systems may increase confidence in the reliability of VIPs. In addition, such quality control systems may enable long-term incremental performance of the production process by using data from the total life cycle of VIP products to increase reliability and other metrics.

In an embodiment, a quality control system 100 may include an in-panel sensor 105 including a dielectric film 110. In an embodiment, the dielectric film 110 may be disc-shaped. In an embodiment, the dielectric film 110 may be coated in a coating, such as alumina, that changes its electrical conductance when exposed to an oxidizing substance, such as water vapor.

The dielectric film 110 may be in operable communication with a radio frequency identification (RFID) unit 115. In an embodiment, the RFID unit 115 may be located within or on the panel, although other locations are also possible within the scope of this disclosure. The RFID unit 115 may transmit information pertaining to the conductance of the dielectric film during a testing operation. In an embodiment, the RFID unit 115 may transmit the conductance to an RFID receiver 120. In an embodiment, the RFID unit 115 may transmit an encrypted signal. As a result, only an RFID receiver 120 having valid decryption keys may be able to decrypt a transmission from the RFID unit 115.

The RFID receiver 120 may enable the transmission from the RFID unit 115 to be received and processed. The RFID receiver 120 may be installed, for example and without limitation, in a production line, at a location within a distribution chain, or at a customer location. In an embodiment, the RFID receiver 120 may be installed as part of a final application for the panel. For example, the RFID receiver 120 may be installed in a thermal packaging unit that includes a sensor monitoring package used to measure the package thermal history. Accordingly, handlers of a VIP product may receive early notification of package failure before it occurs or may otherwise be detected.

A data collation system (or data collation element) 125 may aggregate panel performance data, including the conductance of the panel, that is received from the RFID unit 115 via the RFID receiver 120. The data collation system 125 may enable production engineers and/or customers to learn how to minimize or avoid future panel failures. In an embodiment, the data collation system 125 may not only aggregate and collate panel performance data throughout the life of the panel, but may also associate the production batch of each item used in the production of a VIP product and the actual production metrics, such as the pressure and date of seal, the pressure and heat of the sealing bar, and the like. Analysis of this data may provide valuable feedback information to improve future production performance. According to embodiments, the data collation system (or data collation element) may be implemented in software (for example, a software application, module, or the like), hardware, or a combination thereof.

The embodiments disclosed herein identify a quality control system that has a number of advantages over conventional systems. For example, panels may be tested in real time. Testing should take on the order of 2 seconds or less to perform. Indeed, it is likely that testing can be performed in approximately 0.5 seconds.

Moreover, testing may be performed without human interaction with the panel. Testing may be performed from a remote distance from an inch to a few feet away depending upon the signal strength of the RFID unit and the sensitivity of the RFID receiver.

In addition, the in-panel sensor does not detract from the panel performance because it is statically placed. As such, numerous sensors may be placed in panels allowing easy access for measurement throughout a VIP product if, for example, the VIP product contains relatively large panels.

Panel production information and test history data may be aggregated and collated in an online system that allows manufacturing systems to be improved and performance lifespan to be monitored.

A handheld test unit incorporating the modules described above may be used to perform the quality control test. The handheld test unit may be relatively inexpensive, yet reliable in the retrieval of test data. Moreover, handheld units could be replaced by continuous onsite external monitoring devices for critical applications.

Finally, the quality control system may be capable of reading panels that do not have a flat surface because making direct contact with the surface of a VIP product is not required for quality control checks.

Although the above-disclosed embodiments are described in reference to a quality control system for a vacuum insulation panel, the above-described embodiments may be used in other devices that require a vacuum to be maintained. As such, numerous applications may benefit from the devices and systems described in this disclosure.

Figure 2:
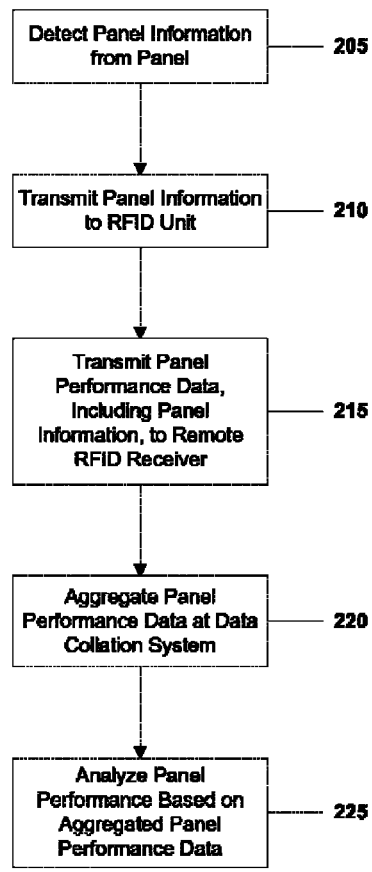
FIG. 2 depicts a flow diagram of an illustrative method of aggregating panel performance data according to an embodiment.

FIG. 2 depicts a flow diagram of an illustrative method of aggregating panel performance data according to an embodiment. As shown in FIG. 2, a panel sensor disposed on a panel may detect 205 panel information. In an embodiment, the panel sensor may detect 205 panel information using a dielectric film. For example, the panel sensor may detect 205 a conductance of the panel using the dielectric film. Other panel information may also be detected 205 within the scope of this disclosure.

The panel information may be transmitted 210 to an RFID unit. In an embodiment, the RFID unit may be in operable communication with the panel sensor and/or the dielectric film. In an embodiment, the RFID unit may be located in or on the panel. Additional information, such as an identification of the panel sensor from which the panel information was transmitted, may also be transmitted 210 to the RFID unit within the scope of this disclosure.

The RFID unit may transmit 215 the panel information and other panel performance data to an RFID receiver that is located remote from the RFID unit. In an embodiment, the panel performance data may include information regarding the sensor and/or the RFID unit from which the panel information is received. Additional information may also be transmitted 215 as part of the panel performance data within the scope of this disclosure.

Panel performance data may be aggregated 220 at a data collation system. The aggregated panel performance data may include, for example and without limitation, panel performance data received over time from a particular RFID unit and/or panel performance data from a plurality of RFID units.

The panel performance may be analyzed 225 based on the aggregated panel performance data. In an embodiment, the panel performance data 225 may be analyzed by a data collation system used to determine the performance of the panel over time. In particular, the data collation system may analyze 225 an expected time to failure or a likelihood of failure for a particular panel based on the panel performance data. In an embodiment, the data collation system may analyze 225 the performance of a plurality of panels made in a batch to determine the mean time to failure for the batch. In an additional embodiment, the data collation system may analyze 225 a performance of panels from a particular manufacturer or set of manufacturers to identify failure data for panels of a particular type. Additional and/or alternate analysis may also be performed within the scope of this disclosure.

Figure 3:
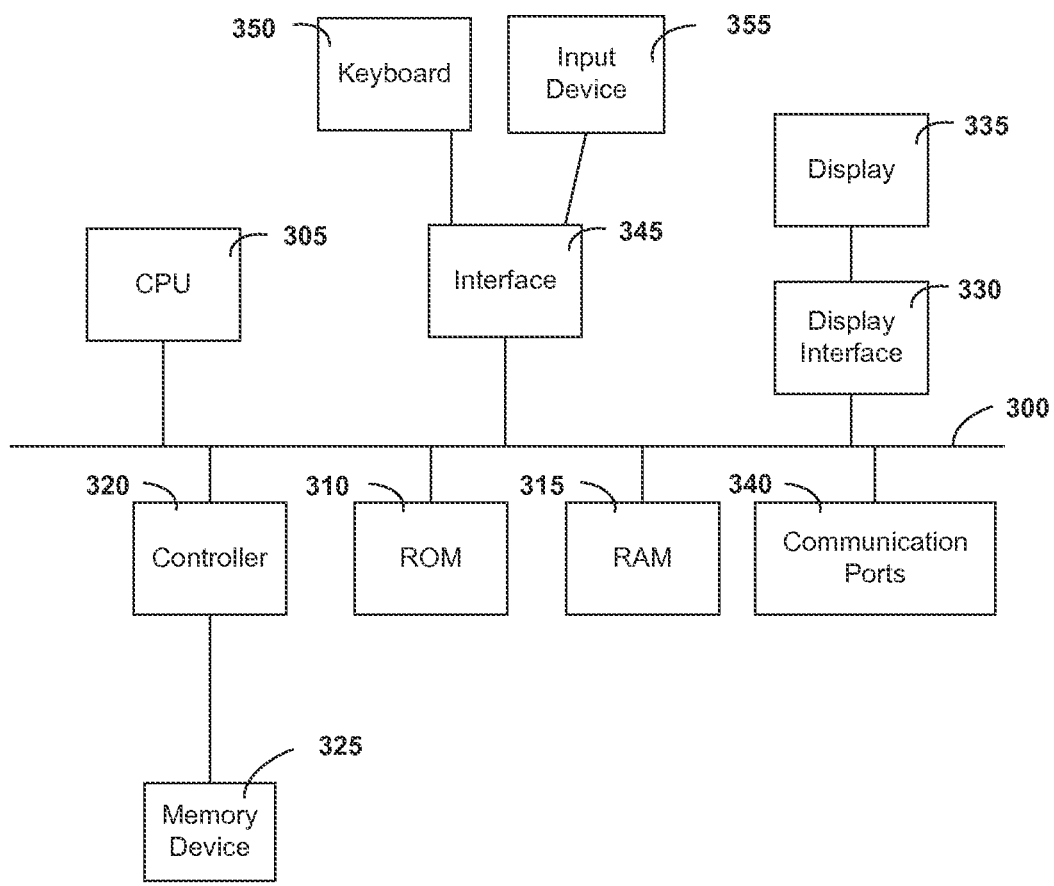
FIG. 3 depicts a block diagram of illustrative internal hardware that may be used to contain or implement program instructions according to an embodiment.

FIG. 3 depicts a block diagram of illustrative internal hardware that may be used to contain or implement program instructions, such as the process steps discussed above in reference to FIG. 2, according to embodiments. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an illustrative processing device, computing device or processor as such terms are used within this disclosure. Read only memory (ROM) 310 and random access memory (RAM) 315 constitute illustrative memory devices (i.e., processor-readable non-transitory storage media).

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 310 and/or the RAM 315. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 330 may permit information from the bus 300 to be displayed on the display 335 in audio, visual, graphic or alphanumeric format. Communication with external devices, such as a print device, may occur using various communication ports 340. An illustrative communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art each of which is also intended to be encompassed by the disclosed embodiments.

What is claimed is:

1. A quality control system for a vacuum insulation panel, the system comprising:
    at least one sensor positioned within the vacuum insulation panel;
    the sensor comprising a dielectric film;
    the dielectric film is coated with a coating comprising an alumina coating configured to change an electrical conductance responsive to exposure to an oxidizing substance;
    a radio frequency identification unit in operable communication with the sensor, the radio frequency identification unit being configured to receive vacuum insulation panel information associated with the vacuum insulation panel including sensed electrical conductance;
    a radio frequency identification receiver configured to receive vacuum insulation panel performance data transmitted from the radio frequency identification unit, the vacuum insulation panel performance data comprising the vacuum insulation panel information; and
    a data collation element in operable communication with the radio frequency identification receiver and configured to analyze aggregated vacuum insulation panel performance data received from the radio frequency identification receiver.

2. The system of claim 1, wherein the radio frequency identification unit is in operative communication with the dielectric film.

3. The system of claim 1, wherein the at least one sensor comprises a plurality of sensors positioned in multiple locations within the vacuum insulation panel.

4. The system of claim 1, wherein the radio frequency identification unit is arranged within the vacuum insulation panel.

5. The system of claim 1, wherein the radio frequency identification unit is configured to transmit encrypted vacuum insulation panel performance data.

6. The system of claim 1, wherein the quality control system is configured as a thermal packaging unit.

7. The system of claim 1, wherein the data collation element is configured to associate the aggregated panel performance data with production batch information associated with the vacuum insulation panel.

8. The system of claim 1, further comprising: a handheld unit comprising a processor and a non-transitory, computer-readable storage medium in operable communication with the processor, the handheld unit having the radio frequency identification receiver positioned therein, wherein the computer-readable storage medium contains one or more programming instructions that, when executed, cause the processor to analyze aggregated vacuum insulation panel performance data via the data collation element.

9. A method of aggregating vacuum insulation panel performance data, the method comprising:
    detecting vacuum insulation panel information using a sensor;
    wherein the sensor detects vacuum insulation panel information using a dielectric film;
    the dielectric film is coated with a coating comprising an alumina coating configured to change an electrical conductance responsive to exposure to an oxidizing substance;
    detecting a conductance of the panel via the dielectric film;
    transmitting, by the sensor, the vacuum insulation panel information to a radio frequency identification unit;
    transmitting, by the radio frequency identification unit, vacuum insulation panel performance data to a radio frequency identification receiver, the vacuum insulation panel performance data comprising the vacuum insulation panel information;
    aggregating vacuum insulation panel performance data at a data collation element; and
    analyzing the aggregated vacuum insulation panel performance data by the data collation element.

10. The method of claim 9, further comprising transmitting identification information associated with the sensor to the radio frequency identification receiver via the radio frequency identification unit.

11. The method of claim 9, wherein analyzing the aggregated vacuum insulation panel performance data comprises determining a likelihood of failure of the vacuum insulation panel based on vacuum insulation panel performance data.

12. The method of claim 9, wherein the radio frequency identification receiver is configured to receive vacuum insulation panel information from a plurality of radio frequency identification units associated with a plurality of vacuum insulation panels.

13. The method of claim 9, wherein the vacuum insulation panel information comprises manufacturer information and production batch information associated with the vacuum insulation panel.

* * * * *